United States Patent

[11] 3,580,267

[72] Inventor Ralph J. Baker
655 N. Main St., Marine City, Mich. 48039
[21] Appl. No. 861,366
[22] Filed Sept. 26, 1969
[45] Patented May 25, 1971

[54] CONDENSATE VALVE
11 Claims, 6 Drawing Figs.

[52] U.S. Cl. .................................................. 137/203,
137/341, 251/144
[51] Int. Cl. ....................................................F16k 49/00,
F16k 51/00
[50] Field of Search.......................................... 251/144,
129, 61.2, 63.4; 137/203, 204, 341

[56] References Cited
UNITED STATES PATENTS
2,589,346 3/1952 DeFrees ...................... 251/144(X)
3,004,549 10/1961 Temple ........................ 137/204
3,114,387 12/1963 Barkan et al. ................. 251/63.4(X)
3,282,293 11/1966 Barger ......................... 137/204
3,424,429 1/1969 Monnich ..................... 251/129

*Primary Examiner*—M. Cary Nelson
*Assistant Examiner*—Michael O. Sturm
*Attorney*—Burton and Parker ABSTRACT: A condensate valve for connection to a compressed fluid tank, specifically an air tank associated with a compressor, to eject accumulated condensate in the tank, comprising a multiple piece valve body made of a tough, high impact plastic such as polycarbonate, each valve body section or part being internally configured to provide a passage for condensate through the valve normally closed by check valve means, and a chamber within which is disposed a diaphragm means having check valve actuating means responsive to diaphragm movement to momentarily open the check valve to exhaust condensate from the air mask.

Patented May 25, 1971
3,580,267
2 Sheets-Sheet 1
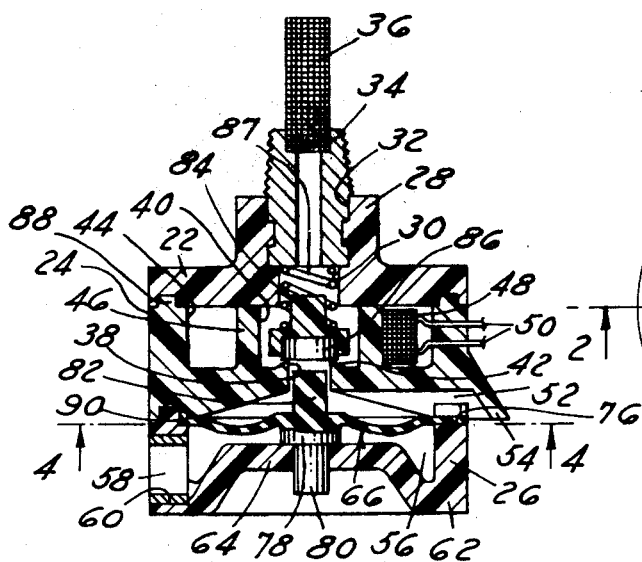
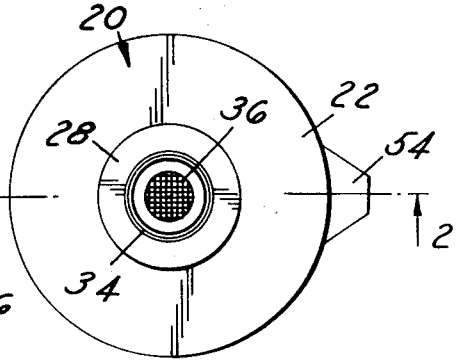
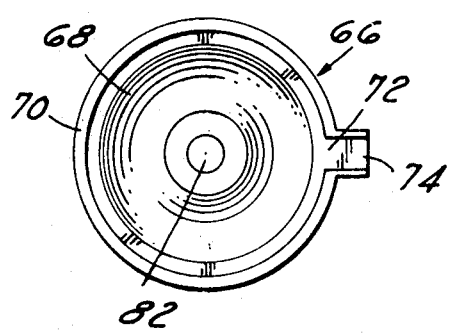
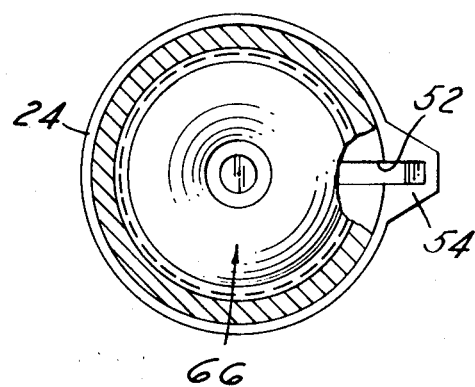
INVENTOR
RALPH J. BAKER
BY
Burton & Parker
ATTORNEYS INVENTOR
RALPH J. BAKER
BY
Burton & Parker
ATTORNEYS 3,580,267

1

CONDENSATE VALVE

BACKGROUND OF THE INVENTION

The invention pertains generally to the field of valves, and more particularly to the field of check valves, wherein the check valve means and its actuating means are enclosed within a common housing, and are connected to an operator which may be located either within the valve housing or remote from the housing. For the particular environment in which the instant valve is to be used, the valve is connected directly to a compressed air tank, and is actuated to open the check valve momentarily at predetermined intervals to exhaust condensate from the air tank to atmosphere.

In prior valves of the general type shown and described herein, the valve body or housing has been constructed of a plurality of metal sections, at least some of which are provided with apertured ears, and the metal sections are secured together by means of bolts extending through the apertures to fix the sections together. Various types of valve mechanisms have been employed within the described housings of the prior art to accomplish the discharge of condensate from a pressurized fluid vessel such as an air tank without any material loss of pressure. One such construction is shown in applicant's prior U.S. Pat. No. 3,080,882 which employs a plunger-type valve in which an operating piston for moving the plunger is formed integrally on the plunger for operation by fluid pressure. Another prior art patent disclosing a valve of the plunger type is shown in U.S. Pat. No. 2,989,978. A different type of construction employing what might be termed a spindle valve is disclosed for example in U.S. Pat. Nos. 2,732,854 and 2,845,081.

SUMMARY

The invention resides in the provision of a multiple section valve housing or body made of high impact, rugged plastic such as polycarbonate, the sections being secured together as by ultrasonic welding or by an adhesive. Disposed within the body is a check valve of novel construction which includes a specially designed valve seat and check valve body adapted to function efficiently and without failure throughout repeated cyclings of the valve. In addition, a new and novel diaphragm means is provided which is disposed within the housing for actuating the check valve momentarily to exhaust condensate from the air tank or the like through the valve to atmosphere.

Other objects, advantages and meritorious features of the invention will more fully appear from the following description, claims and accompanying drawings wherein:

FIG. 1 is a top elevation of a condensate valve embodying the invention;

FIG. 2 is a cross-sectional view of the valve of FIG. 1 taken along line 2–2 of FIG. 1;

FIG. 3 is a top elevation of the diaphragm means employed in the valve of FIGS. 1 and 2;

FIG. 4 is a cross-sectional view taken along line 4–4 of FIG. 2 showing the diaphragm positioned in the valve housing;

Figure 5:
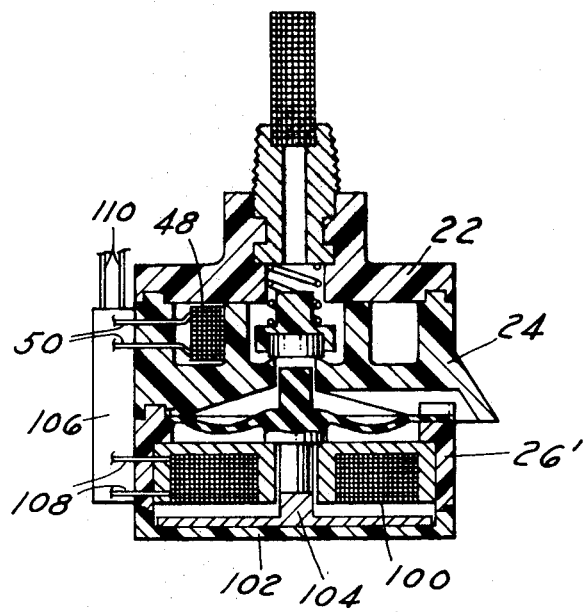
FIG. 5 is a cross-sectional view similar to FIG. 2 showing a second preferred embodiment of a condensate valve embodying the invention.

Turning now more particularly to the drawings, there is illustrated in FIGS. 1 and 2 a condensate valve having a valve body 20 made out of a tough, hard plastic such as polycarbonate or the like, the body including a plurality of body sections, in this case three, indicated at 22, 24 and 26 in FIG. 2. The first or top body section 22 includes an axially extending boss 28, and is provided with a fluid passage 30 extending therethrough having a counterbore 32 at its outer end within which is received a fitting 34. The fitting 34 is fixedly secured within the counterbore 32 as by ultrasonic welding or it may be molded in place, and is externally threaded for direct connection to the air tank or the like from which condensate is to be exhausted. A strainer 36 may be mounted atop the fitting

2

34, and may be of any suitable construction, such as a wire mesh screen, plastic screen, or the like, to prevent large particles of dirt and/or other contaminates from entering the valve.

Intermediate valve section 24 is provided with a fluid passage 38 opening axially therethrough and defining an axial valve chamber 40 having a circumferentially extending valve seat 42 formed in its walls at the entrance to passageway 38. The valve seat 42 is so formed by the walls of the body section 24 as to lie spaced above the lowermost wall defining the valve chamber 40, for a purpose which will be described more fully hereinafter. Valve body section 24 is in addition formed to define an annular recess 44 spaced from the valve chamber 40 and separated therefrom by the intermediate wall portion 46. A heater element, which may be of ringlike configuration, one portion of which is shown at 48 in FIG. 2, is disposed within the recess 44, and electrical leads 50 extend out of the valve body from the heater 48 for connection to a suitable source of electric current. Valve body section 24 also has a radially extending cutout extending from the fluid passage 38 and opening through a sidewall thereof shown at 52 in FIGS. 2 and 4, and the sidewall portion adjacent the cutout 52 is flared outwardly and downwardly as indicated at 54 to provide a deflector to direct the condensate being exhausted in a downward direction to prevent it from splashing on other parts of the equipment.

The third or lowest body section 26 shown in FIG. 2 is shaped to define a chamber 56 having a laterally opening inlet 58 through one sidewall of the section, within which opening is fixed a metal insert 60 made out of a metal such as brass or other noncorrosive material, and which may be suitably threaded for connection to a male fitting member (not shown) for coupling the inlet to a suitable source of fluid such as air under pressure, the purpose of which will be described more fully herebelow. The end or bottom wall 62 of the section 26 is preferably provided with a central recess portion 64 for purposes to be presently described. Disposed within the chamber 56 of valve body section 26 is a diaphragm means generally indicated by the numeral 66, a top elevation of which is shown in FIG. 3. The diaphragm 66 may be made out of any suitable flexible material such as neoprene rubber, urethane plastic or the like, and includes a dishlike flexible diaphragm portion 68 surrounded by a circumferential flange 70 upstanding from the dishlike portion, the flange 70 being interrupted at 72, whereat there is provided a channel-shaped trough or the like 74, which interfits into a corresponding recess 76 in valve body section 26, as shown in FIG. 2. Centrally of the diaphragm 66, it exhibits a central hub portion 78, which projects downwardly from the plane of the flexible diaphragm portion 68, and normally rests against the inner surface of bottom wall 64 on body section 26. The hub portion 78 is provided with a downwardly extending post or projection 80 which extends through an aperture in bottom wall portion 64 which is somewhat oversize the post 80, while projecting from the upper surface of the diaphragm is a valve actuating post 82 which projects into the passageway 38 to actuate the check valve to be described. The central hub portion 78 and axially projecting posts 80 and 82 on element 66 are of an appreciably higher durometer than the diaphragm portion 68, and are in fact quite rigid and inflexible with relation to the flexible diaphragm portion.

Positioned within the valve chamber 40 and body section 24 is a check valve generally indicated at 84, the valve body portion of which is essentially T-shaped in cross section, the head portion of which is provided with a cylindrical counterbore within which is fixed a sealing disc 86, the valve body 84 being preferably made of a rigid, high impact plastic such as polycarbonate, while the inset 86 which actually engages the valve seat 42 is made of a softer material having good sealing qualities, such as neoprene rubber urethane of the like. Alternatively, the valve body 84 may be of one-piece construction made out of a plastic material such as urethane, which is impervious to contaminants and will not become encrusted with particles of dirt or other materials passing through the valve. A coil spring 87 is provided which lightly bears against the head portion of the valve body 84 and encircles the shank portion of the body, the upper end of the spring bearing against the underside of the fitting 34.

The heater element 48 is preferably of special construction of the so called basic thermistor design. Such is a current limiting device that changes resistance as its temperature rises, so that once the heating element reaches a temperature of about 190°—200° F. the resistance of the heater increases to a point where the current flow therethrough approaches zero. As the heating element cools somewhat, the resistance will correspondingly decrease, allowing the current to flow in proportion to the heat required to maintain the valve at a temperature above freezing. Equipped with this current limiting device, the valve is always maintained in readiness for operation, even in extreme low-temperature conditions. As this valve is designed primarily for use with air tanks on vehicles having air operated braking systems, which must be reliable and operational under extreme conditions of moisture, temperature and vibration, the parts thereof must be reliable under such adverse conditions. The heater 48 employed eliminates any open heating wires, resistor devices, thermostats, insulators and other parts that have heretofore been employed in such valves, and thus greatly increases the reliability of the valve.

The operation of the valve will now be described, assuming that the fitting 34 is screwed into a suitable threaded opening in the air tank of a vehicle braking system, and that the inlet port 58 is suitably coupled to the vehicle braking system to be pressurized by exhaust air upon release of the vehicle brakes. Accumulated condensate, consisting largely of water or water mixed with oil, will flow through the strainer 36 which projects into the air tank, through the fitting 34, and into the chamber 40, which in the normal position of the valve 84 is closed by the contact between the valve and the valve seat 42. The check valve 84 is actuated or opened by means of a momentary pressurization against the underside of diaphragm 66. This type of actuation is normally provided from the braking system by a brake quick release valve or similar device that provides a momentary burst of air.

This momentary pressurization acts against the underside of the diaphragm 66 forcing the valve actuating post 82 against the underside of check valve 84, raising the valve from its seat and allowing the condensate to flow through passage 38 and outlet 52 to atmosphere. Because of the differential in area between diaphragm 66 and the effective area of check valve 84, a 20 pound air pressure exerted on the diaphragm will be sufficient to open the check valve against a pressure in the air tank and the valve chamber 40 of 120 pounds.

The valve actuating portion 82 is quickly retracted from engagement with the valve 84 so that the valve is opened only momentarily, because of the construction of the hub 78 and post 80 under the diaphragm. When the port 58 is momentarily pressurized by exhaust air from the vehicle braking system, the diaphragm is flexed, raising hub 78 from contact with wall 64 to expose the aperture through which stem 80 extends, and the aperture being oversize the portion 80, pressure air will be allowed to escape through the aperture, decreasing the pressure against the underside of the diaphragm. While the valve is open, condensate is exhausted therethrough and out of port 52 under pressure from the air tank. The valve body 84 will be only momentarily held spaced from the valve seat 42, being returned quickly to the seat by the air tank pressure thereagainst assisted by spring 86 as the actuating member 82 retracts from contact against the lower end of valve body 84.

While the strainer 36 is designed to keep out large particles of dirt and other contaminates which might otherwise enter the valve chamber 40 and impair operation of the check valve, small particles of dirt and the like will inevitably enter the valve. To prevent such contaminates from affecting the check valve operation, the valve seat 42 lies spaced above the bottom wall of the valve chamber 40, so that particles of dirt and the like cannot accumulate immediately adjacent the seat, but will fall to the bottom of the chamber.

When the valve is momentarily opened to exhaust condensates from the chamber 40, these small particles will be either exhausted with the outrush of condensate, or, if they somehow remain within the chamber 40, will fall back to the bottom of the chamber spaced from the valve seat once the valve is again closed. Therefore, the valve operation will not be impaired by the presence of small particles of contaminate which might become lodged in the valve seat area with other types of valve construction. Additionally, if the valve 84 is made of urethane, any larger particles becoming entrapped between the seat 38 and sealing face of the valve will not stick to or become embedded in the valve face because of the unique properties of the urethane material, and such particles will be expelled from the valve during the next following operating cycle.

Another important feature of the condensate valve is the construction of its various sections 22, 24 and 26 out of tough polycarbonate plastic which is highly resistant to the common hazards of corrosion, rust, and attack from the salts and chemicals encountered on highways. As can be seen in FIG. 2, each of the valve body sections is provided with cooperating interfitting portions engageable with adjacent sections, such as indicated at 88 in FIG. 2. Also, the peripheral flange 70 of the diaphragm 66 is entrapped between the juncture of the two body sections 24 and 26, as shown at 90, to hold the diaphragm in fixed relation in the housing.

With the valve body sections assembled together with all the internal parts in place, the body sections are preferably ultrasonically welded together to form a fluidtight integral structure. Alternatively, a suitable adhesive could be employed to secure the sections together, instead of the ultrasonic welding technique. This eliminates many of the separate parts which were required in prior art designs of similar valves, and in addition to reducing the complexity of the construction, materially adds to its reliability, as an integral sealed valve body is provided which is not subject to leaks, and is impervious to corrosion, rust and chemical attack.

In FIG. 5 there is illustrated a slightly different construction, wherein similar parts have been allotted corresponding reference numerals, the principal difference between such showing and the showing of FIG. 2 lying in the provision of an electromagnet 100 which is disposed in the slightly modified lower valve body section 26'. The body section 26' is provided with a lower cover plate 102, which is secured to the body section 26' by ultrasonic welding or by adhesive, similarly to that previously described.

The electromagnetic coil 100 is spaced above the wall of member 102, and there is provided a substantially T-shaped armature 104, the shank of which engages the underside of diaphragm post 80 whereby upon energization of the coil 100, the armature is drawn into the coil, thereby shifting the diaphragm 66 upwardly to open check valve 84. The electromagnet or solenoid 100 is momentarily energized to provide condensate exhaust through the valve without loss of pressure within the air tank to which it is connected. The control for the solenoid 100 may be mounted in a small enclosure 106 into which the electrical leads 108 extend, and also the leads 50 from the heating element 48, such being supplied with current from a suitable source via the wires 110. However, if so desired, the control may be located remote from the valve, with only the leads 50 and 108 extending through the valve body.

Figure 6:
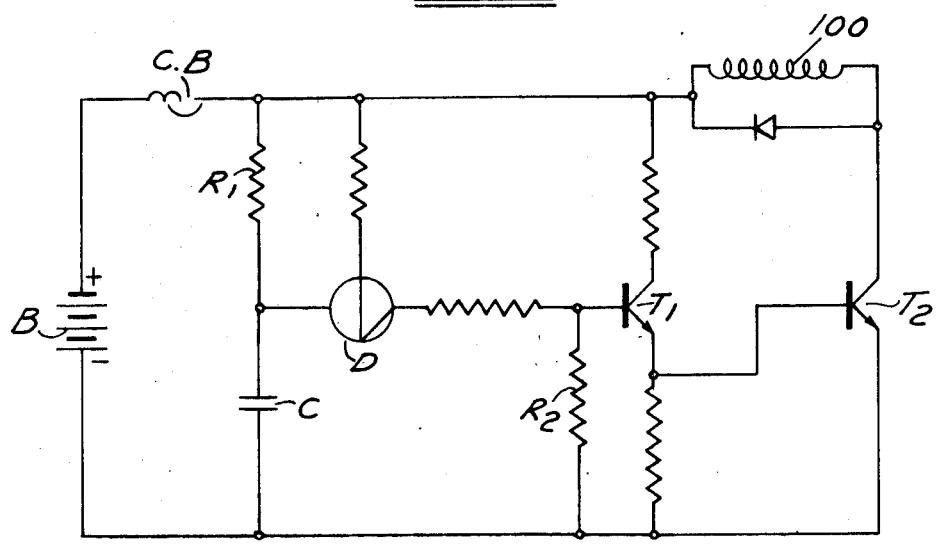
FIG. 6 is a schematic diagram of the electrical circuit for operating the valve depicted in FIG. 5.

In FIG. 6 there is shown a circuit for controlling the periodic operation of the solenoid coil 100 comprising a source of current in the form of a battery B, which in the case of a vehicle would be the standard 12-volt battery which is connected in series with an overload circuit-breaker CB, the battery normally connected across a capacitor C through a high resistance R1 to slowly charge the capacitor. When the capacitor becomes fully charged, it discharges through a diode D, in this case a trigger diode, which bleeds part of the current back to ground through the resistor R2 and part to the base of a first transistor T1. The trigger diode D acts as a switch and does not complete the circuit until the voltage drops to a predetermined level, say about 1 volt. As part of the current flow from the diode passes through resistor R2 a predetermined amount of current will flow to the transistor T1, which now acts as an amplifier, allowing current to flow through its collector to the emitter. Transistor T1 has its emitter in turn connected to the base of transistor T2 which also acts as an amplifier to permit a current to flow into the coil of the electromagnet or solenoid 100, thereby momentarily actuating the solenoid to shift the diaphragm 66, thereby opening check valve 84 to exhaust condensate through the valve. The timing of the circuit shown in FIG. 6 is determined by the time it takes to charge the capacitor C and thereafter discharge it through the diode D. This is a function of the capacitance of the capacitor C and resistance of R1, the time being increased by the time it takes the current to trigger the diode D.

This circuit gives a time function plus providing an output that is amplified through two stages by the transistors T1 and T2 to provide sufficient current to operate the relatively heavy duty coil 100. The circuit is fail-safe, because any failure of the capacitor C will prevent triggering of the diode D, and any short circuit will keep the capacitor C charged in which event no current will pass to the diode D.

What I claim is:

1. A condensate valve for connection to a compressed fluid tank comprising: a valve body made of a plastic material including three separate body sections sealingly welded together to provide a fluidtight unitary structure, a first of said sections having a fluid passage therethrough and a fitting sealingly welded therein for connection to said fluid tank, an intermediate section having a fluid passage therethrough defining a valve chamber having a valve seat at one end thereof, and a third section defining a fluid chamber having a fluid outlet opening laterally through a sidewall thereof and a passage opening through the exposed end wall of the section; check valve means in said valve chamber biased into engagement with said valve seat; diaphragm means extending across said fluid chamber spaced below said fluid outlet having an upstanding peripheral lip sealingly entrapped between said intermediate and third valve body sections and an axially extending post on each side of the diaphragm, one post projection toward said check valve means for shifting said valve away from the valve seat upon flexure of said diaphragm and the opposite post projecting through said third body section passage; and means operatively coupled to said diaphragm means to flex the latter for momentarily actuating said check valve, thereby exhausting condensate from said tank through said outlet.

2. The invention defined in claim 1 characterized in that said valve body sections each exhibit corresponding peripheral sidewalls having cooperating end portions for mating engagement with cooperating portions on adjacent sections to maintain the sections in predetermined relative position prior to their being welded together to form a fluidtight valve body structure.

3. The invention as defined in claim 2 characterized in that said diaphragm means has an upstanding circumferential flange fixedly entrapped between said mating surfaces of said second and third valve body sections.

4. The invention defined in claim 1 characterized in that said third body section includes an inlet for connection to a source of fluid under pressure, and said opposite post includes a portion normally blocking said section passage and shiftable with said diaphragm in response to fluid pressure thereagainst to open said passage to atmosphere.

5. The invention defined in claim 1 characterized in that said third body section includes a recess below said diaphragm, an electromagnet in said recess, and a magnetic core within said electromagnet for moving said diaphragm upon actuation of the electromagnet.

6. The invention defined in claim 5 characterized in that said diaphragm means includes an integral axial post projecting toward said electromagnet, and said magnetic core includes a part projecting toward the diaphragm post for moving the diaphragm.

7. The invention defined in claim 1, characterized in that said check valve comprises a generally T-shaped valve element in cross section having a flat resilient face for sealing engagement against said valve seat, said element being made of urethane, and spring means encircling the base portion of said T-shape and bearing against the head portion to resistingly urge the valve element into engagement with said seat.

8. The invention defined in claim 1 characterized in that said check valve comprises a generally T-shaped valve element in cross section having a cylindrical recess in the head portion thereof, a cylindrical resilient sealing member fixed in the recess for sealing engagement against said valve seat, and spring means encircling the base portion of said T-shaped valve element and bearing against the head portion thereof to resistingly urge the element into engagement with said seat.

9. The invention defined in claim 1 characterized in that said diaphragm means comprises an integral structure including a flexible, platelike diaphragm portion having an upstanding circumferential flange extending therearound, and a substantially rigid central hub portion having rigid postlike elements projecting axially from opposite sides of said diaphragm portion.

10. The invention defined in claim 1 characterized in that said intermediate valve body section comprises an annular recess extending in spaced-apart relation to said valve chamber, and an electric heating element disposed in said recess.

11. The invention defined in claim 10 characterized in that said electric heating element is of a self current limiting type.